E. W. KUHN.
PROCESS OF MANUFACTURING FERMENTED BEVERAGES.
APPLICATION FILED FEB. 19, 1909.
936,328.
Patented Oct. 12, 1909.
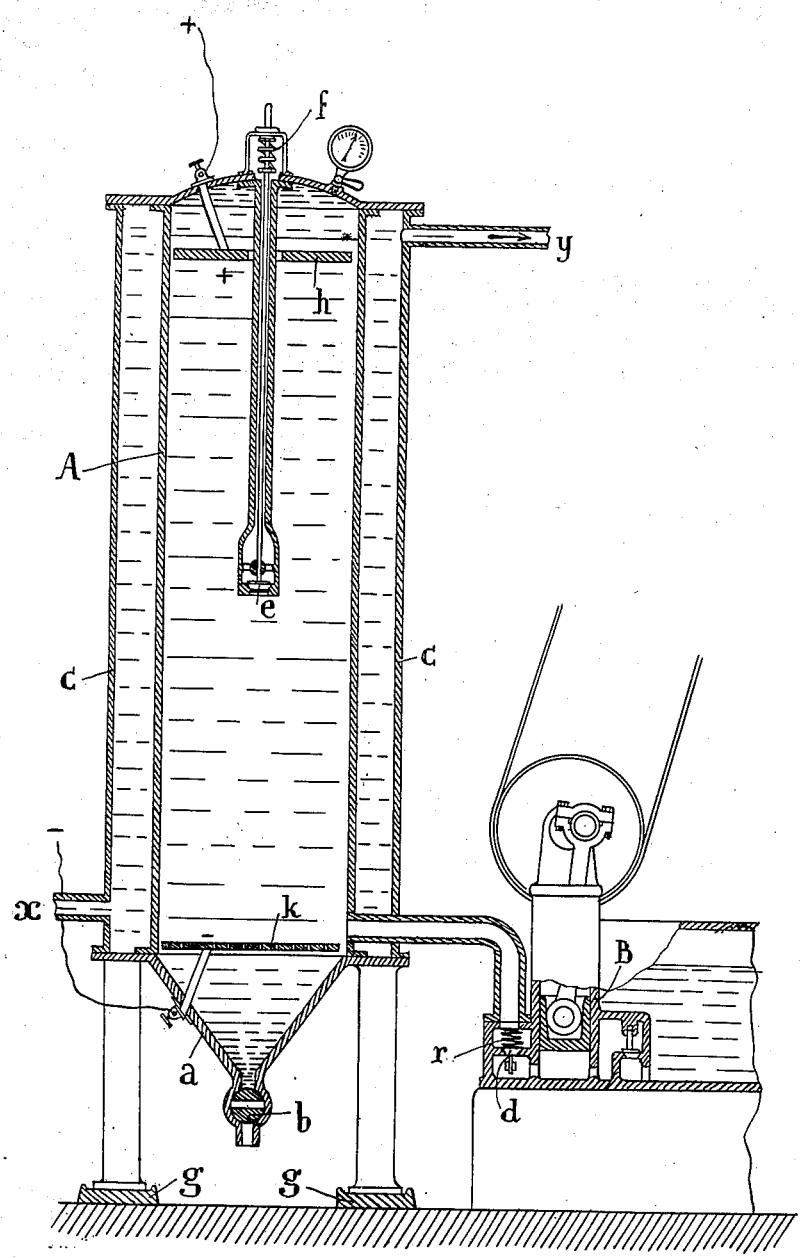
WITNESSES:
INVENTOR,
ETIENNE WILLIAMS KUHN,
by
Attorney.

UNITED STATES PATENT OFFICE.

ETIENNE WILLIAMS KUHN, OF LONDON, ENGLAND.

PROCESS OF MANUFACTURING FERMENTED BEVERAGES.

936,328.

Specification of Letters Patent. Patented Oct. 12, 1909.

Application filed February 19, 1909. Serial No. 478,771.

*To all whom it may concern:*

Be it known that I, ETIENNE WILLIAMS KUHN, a citizen of the French Republic, and residing at London, England, have invented a new and useful Improved Process of Manufacturing Fermented Beverages; and I do hereby declare the following to be a full, clear, and exact description of the same.

Fermented beverages in use at the present time may be classified under two heads:— (1) those which lose the carbonic acid gas during the fermentation, such as ordinary wines, cider in casks and English beers, made by top fermentation; (2) beverages in which the carbonic acid gas is retained during the fermentation such as champagne, which retains its gas owing to pressure, and beers made by bottom fermentation, which retain the gas by artificial cooling.

Hitherto it has not been economical or practicable to retain the carbonic acid gas in ordinary wines, ciders and English beers, because the sole known means is mechanical chilling, which is too costly to be applied on a large scale to beverages of low price, such price not permitting the costly installation of refrigerating machinery.

It has been proposed to impart to English beers and ordinary wines the attraction belonging to effervescent beverages by introducing into them at a low temperature or under pressure carbonic acid gas which has been previously stored or liquefied, or by introducing the carbonic acid gas previously recovered during the fermentation.

The processes suggested have given insufficient results, and the tendency is to abandon their use, because they have never produced beverages having the qualities and attractiveness of beverages wherein the carbonic acid gas has been formed naturally and from the beginning by the fermentation.

The reason why the means hitherto used have proved insufficient for the purpose in question may be explained as follows:—The qualities of beverages of the second class defined above are due to the fact that the carbonic acid gas resulting from the natural fermentation exists in the liquids in the form of combinations, while in the attempts hitherto made to make ordinary wines, ciders and beers of the first class effervescent, the carbonic acid gas has only been introduced into the liquid so as to exist therein in a dissolved form.

When, after fermentation, the carbonic acid gas is re-incorporated with the liquid either by pressure or by chilling the gas exists in the liquid only in the form of a solution. The gas remains in this form so long as the vessels containing the liquids are closed, or so long as they are maintained at a low temperature, owing to the coefficient of solubility of the carbonic acid gas corresponding with the low temperature or with the pressure, or with both combined. As soon as the vessel containing the liquid enriched in carbonic acid gas is opened, or as soon as the liquid is exposed to the atmospheric pressure and to the temperature of the surrounding air in an intermediate vessel, such as the glass of the consumer, the gas which is no longer retained in the liquid, under the influences named above, escapes in great part and the liquid becomes flat, insipid, and impoverished in gas when it arrives in the mouth of the consumer. This is the cause of the want of success attending the processes proposed for making wines, ciders and beers of the first class effervescent. On the other hand, beers made by bottom fermentation and champagne possess organoleptic properties completely different. It is known that substances in the nascent state have properties of affinity and reaction tendencies quite different from those of the same substances in the ordinary state.

When a fermentable saccharine liquid is fermented, the operation being checked by cold or pressure for example, the molecules of carbon dioxid form very slowly, and in this molecular form they have time as they are generated in the nascent state to combine chemically with a large number of substances which enter into the composition of fermented beverages. Thus, with alcohols, ethers are formed which play an important part in the taste and perfume of the beverage; the carbohydrates and the phosphates give rise to acid phosphates and bicarbonates, combining with lecithine and choline. The nitrogenous materials, such as albuminoids, peptones and amids, form carbamic acids and carbamates by combination with the dextrins, gums and pectic substances. Moreover, independently of the numerous chemical combinations referred to above which give rise to solid liquid and stable compounds, the carbon dioxid, owing to its slow formation and its infinite molecular subdivision in the nascent state, also gives rise to physico-chemical properties of which the following are the principal:—In consequence of the affinity and of the exceptional catalytic properties that carbon dioxid possesses in this nascent form, it becomes incorporated in what may be called an intra-atomic manner with the sugars and the alcohols. There is an absorption by surface attraction of the positive colloidal molecules. These various phenomena produce around the microscopic bubbles of the carbonic acid gas the formation of pellicles of albumoses which form within the liquid bubbles like those which when produced outside the liquid give rise to the phenomenon of foam. For all these reasons which have been analyzed by me, and to which very probably numerous and complex further reasons could be added, it is evident that it is only by exceedingly slow fermentation that the reactions can be produced which result in a fermented beverage inclosing carbonic acid gas in the form of stable combination, and not of simple dissolution. Now all the organoleptic qualities which give commercial value and digestive properties to the beverages in question are due to the fact that in a liquid containing carbonic acid gas in the form of combination the gas remains incorporated even when the liquid is exposed to the atmospheric pressure and the temperature of the room, and even when it is poured out before arriving in the mouth of the consumer. It is only when the liquid comes into contact with the mouth and is thus raised in temperature that these combinations are dissociated, and it is this dissociation in contact with the papillary nerves of the organ of taste which produces the physiological sensation of sapidity peculiar to champagne and beer made by bottom fermentation, a sensation which has been the origin of the success and the value of these beverages. These facts may be verified by comparing a mineral water containing bicarbonates and yielding this agreeable sensation of sapidity, with an artificial soda-water from which the gas escapes in the glass so that a water nearly free from gas arrives in the consumer's mouth. Again, if the naturally combined carbonic acid gas be expelled from champagne or from Munich beer, and there be constituted for it gas added artificially, the natural sapidity and taste of the liquid will never be restored.

The present invention relates to a process designed for producing slow alcoholic fermentation in ordinary beverages, without having recourse to artificial cooling which is too costly in such cases. For this purpose the fermentable liquid is confined almost from the beginning of the fermentation in large enameled steel containers constructed to resist very high pressures such as 20–30 atms. Such a container is shown in vertical section in the accompanying drawing.

The container A is a cylinder having a conical bottom for the purpose of facilitating withdrawal of deposited yeast by means of a cock $b$. A jacket $c$ around the cylinder serves for circulation and a cold liquid admitted at $x$ and leaving at $y$. When fermentation is complete and before the racking operation, in order to reduce the pressure necessary for the racking, the cold liquid is thus circulated and the carbonic acid gas is therefore retained during the racking operation. The container is lined with an enamel incapable of being attacked by acids or organic liquids. This container A is charged with the fermentable liquid in such a manner that there is not the least free space for gas between the liquid and the top of the vessel. The container, which is generally of large dimensions is then hermetically closed in a suitable manner and put into communication with a compressing pump B by which liquid of the same nature as that contained in the container is introduced without admission of any gas, so as to subject the liquid in the container to a pressure of 20 atms. This pump B is of massive silver, the only metal which in spite of its wear by friction is in no way attacked chemically by the organic acids of fermented beverages. A pump might be made for this purpose of glass. The pump is arranged only as a forcing pump, and does not exert suction, so that the liquids containing gas are never subjected to a reduced pressure capable of determining the liberation of gas.

When the pressure of 20 atms. has been attained with aid of the pump, the communication between the container and the latter remains closed by a massive silver valve $d$ subjected to the action of a spring $r$, the valve being adjusted to lift at a pressure of 20 atms., and to uncover the small port, and to close again automatically as soon as the pressure has fallen to 20 atms. The liquid thus remains confined in the hermetically sealed container under a pressure of 20 atms.

All the parts which are in contact with the liquid namely cocks, valves, or the like, are of pure massive silver or glass. The pipes are of pure silver. The enamel of the container is absolutely free from all traces of metal salts which could form combinations with the organic acids of fermented liquids.

The container has a special valve $e$ situated within the liquid and hermetically closed by a spring $f$ so adjusted that the valve remains absolutely tight up to a pressure of 20 atms., and that as soon as this pressure is exceeded the valve lifts a little to allow a small quantity of liquid to be expelled, so as to bring back the pressure to 20 atms. Thus the valve completely closes the vessel up to the pressure named, but does not permit the pressure to exceed that point.

The fermentable liquid being thus confined under pressure as soon as the yeast attacks the molecules of sugar to decompose them into alcohol and carbon dioxid the first molecules of gas formed are under such a pressure that they cannot assume a gaseous form, and remain liquid because of the coefficient of solubility of the carbon dioxid at the pressure in question. It follows that the liquid carbonic acid surrounds the yeast cells which have secreted it, and according to the principle that every product of secretion is toxic to the organism which has secreted it, this contact between the yeast cells and the liquid carbonic acid gas paralyzes and completely checks the vitality and the development of the yeast cells. The carbonic acid gas thus liquefied is retained around the yeast cells which it invests playing the part of an antiseptic and completely checking the fermentation even to a greater extent than cold would check it. It is owing to this arrangement that without using artificial cooling, the fermentation may be sufficiently checked for the carbonic acid gas in the nascent state to be produced slowly enough and in an automatic state of subdivision sufficient to allow time for the formation of the combinations already explained.

The enameled container is mounted on insulating feet $g$. A disk $h$ of copper thickly coated with silver is placed in the upper part of the liquid and is connected with the anode of a source of continuous current. A similar disk $k$ is situated in the lower part of the liquid and is perforated to allow passage of the deposited yeast so that the latter may fall into the coned bottom of the container. This second disk $k$ is connected with the cathode of the source of electric current.

As soon as the fermentation has set in, the circuit of the electric current is completed, and the current is passed during the whole of the fermentation process. This electric current is about of the strength of the currents used in the galvanoplastic art. The object of this arrangement is to control the fermentation. I have observed that, if an electric current is passed through a liquid undergoing fermentation, the colloidal acid molecules wander to the anode, while the colloidal basic molecules wander to the cathode. The action of these slow currents determines the absorption, as a result of the attraction produced by the surfaces of the colloidal molecules which form on the two poles a sort of skin enveloping the microscopic bubbles of carbonic acid gas in the nascent state.

The action of the slow electric currents has the effect of grouping around the positive electrode a large quantity of carbonic acid gas molecules surrounded by pellicles of albumose forming a sort of interior froth analogous to the exterior froth of sparkling liquids, incorporating within the liquid large quantities of carbonic acid gas in this normal form with a coefficient of affinity, of stability, and of fixity much greater than under the ordinary conditions of fermentation. The combination of this effect of the electric current with the pressure described above, brings about an incorporation of carbonic acid gas with a degree of fixity and resistance which have never been attained hitherto.

When the fermentation is at an end, the fermented liquid has a content of carbonic acid gas in combination far superior to that which exists even in champagne and in beers made by bottom fermentation. In fact, if the phenomena that proceed in a bottle of champagne, are analyzed, it is easy to see scientifically that the conditions are different. When a bottle of champagne is closed and fermented, it is essential, in order to avoid fracture to leave a space for the gas amounting to about 10 per cent of the total value of the bottle between the liquid and the cork, so that the wine is inclosed simply under atmospheric pressure, and the first period of fermentation is in no way checked by the pressure. It is only when a considerable part of the fermentation has occurred that the gas produced collecting in the aforesaid space presses upon the liquid sufficiently to check the termination of the fermentation and to store a portion of the gas in the wine; it seems, then, that in a bottle of champagne all the gas which has been produced during a considerable part of the fermentation, has escaped from the liquid in a gaseous state to create a pressure in the said space; consequently the whole quantity of carbonic acid gas which has played this purely mechanical part has not remained sufficiently long within the liquid in contact with organic substances to give rise to the chemical combinations described above. It is only toward the end of the fermentation that the latter is sufficiently checked by the gas already produced for the phenomena already explained to occur.

In the actual manufacture of champagne in bottles, a very small part of the sugar transformed by the fermentation, that is to say, only the fraction which is transformed at the end of the fermentation, can give rise to chemical combinations of the carbonic acid gas which are obtained in the new process not only at first, but also throughout the whole transformation.

The fermentation and the phenomena of chemical combinations of the carbonic acid gas being finished, the sediment of yeast collected in the lower conical part of the container is expelled, the liquid is brought to a temperature as low as possible to coagulate the albuminoid matters which are liable afterward to render turbid the liquid, which is then run into sterilized filters of asbestos paste. It is then racked under pressure and confined in bottles or casks for transport.

Having fully described the nature of my invention, what I claim and desire to secure by Letters Patent is:—

1. The improved process of manufacturing fermented beverages, which consists in conducting the fermentation in a large container completely filled with liquid, raising the pressure on the liquid in said container to about 20 atms. by forcing into the container liquid of the same nature as that already contained therein in such a manner that no gas enters or is formed within the forcing device and the container, substantially as and for the purpose set forth.

2. The improved process of manufacturing fermented beverages, which consists in conducting the fermentation in a large container completely filled with liquid, raising the pressure on the liquid in said container to about 20 atms. by forcing into the container liquid of the same nature as that already contained therein in such a manner that no gas enters or is formed within the forcing device and the container, and passing an electric current through the fermenting liquid, substantially as and for the purpose set forth.

In testimony whereof, I have signed my name to this specification in the presence of two subscribing witnesses.

ETIENNE WILLIAMS KUHN.

Witnesses:
  H. D. JAMESON,
  G. W. VAN HARTE.